United States Patent
Gershenson

(10) Patent No.: US 6,209,175 B1
(45) Date of Patent: Apr. 3, 2001

(54) FASTENING SYSTEM

(76) Inventor: Bruce Gershenson, 26645 Irving, Franklin, MI (US) 48025

(*) Notice: Subject to any disclaimer, the term of this patent is extended or adjusted under 35 U.S.C. 154(b) by 0 days.

(21) Appl. No.: 08/927,239

(22) Filed: Sep. 11, 1997

Related U.S. Application Data

(63) Continuation-in-part of application No. 08/788,132, filed on Jan. 24, 1997, now Pat. No. 5,799,378.

(51) Int. Cl.[7] ............................................. F16B 13/06
(52) U.S. Cl. ............................ 24/297; 24/662; 24/671; 24/682.1; 411/508; 411/509
(58) Field of Search ........................... 411/508, 509, 411/182, 913; 24/297, 453, 662, 671, 682.1, 686

(56) References Cited

U.S. PATENT DOCUMENTS

| | | |
|---|---|---|
| 2,946,612 * | 7/1960 | Ahlgren ........................ 24/662 X |
| 3,101,517 | 8/1963 | Fox et al. . |
| 3,824,933 | 7/1974 | Lind . |
| 3,829,938 | 8/1974 | Ballin . |
| 3,988,808 * | 11/1976 | Poe et al. ........................ 24/297 X |
| 4,506,419 * | 3/1985 | Mitomi ............................... 24/297 |
| 4,952,106 * | 8/1990 | Kubogochi et al. ............ 411/508 X |
| 5,097,570 | 3/1992 | Gershenson . |
| 5,212,853 | 5/1993 | Kaneko . |
| 5,217,337 * | 6/1993 | Junemann et al. .............. 24/297 X |
| 5,580,204 * | 12/1996 | Hultmann ......................... 24/297 X |

FOREIGN PATENT DOCUMENTS

| | | |
|---|---|---|
| 264770 | 9/1968 | (AT) . |
| 1390653 * | 1/1965 | (FR) ..................................... 24/297 |

* cited by examiner

Primary Examiner—James R. Brittain

(57) ABSTRACT

A locking device includes a projecting member and a retaining member. The projecting member has a bulbous head which is securely retained by the retaining member which includes a body portion having a passageway or void formed therethrough. An interference defined by at least one embossment is disposed within the passageway to provide a reduced diameter portion which precludes separation of the projecting member from the retainer. Depending on the materials of construction the interlocking relationship between the projecting member and the retainer can be permanent.

2 Claims, 4 Drawing Sheets

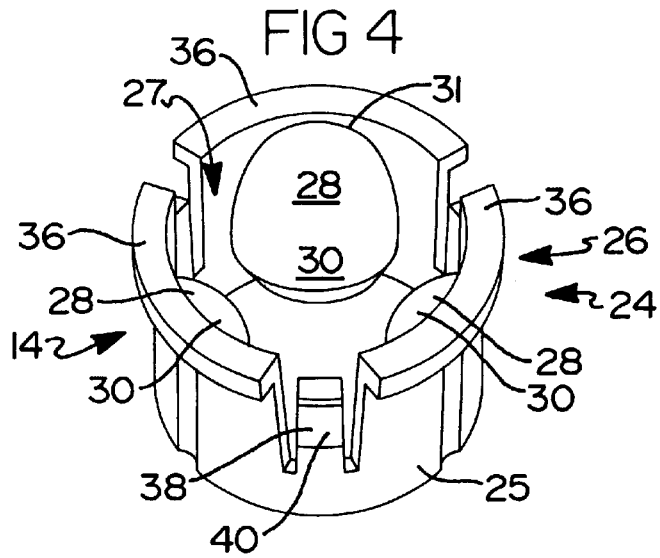
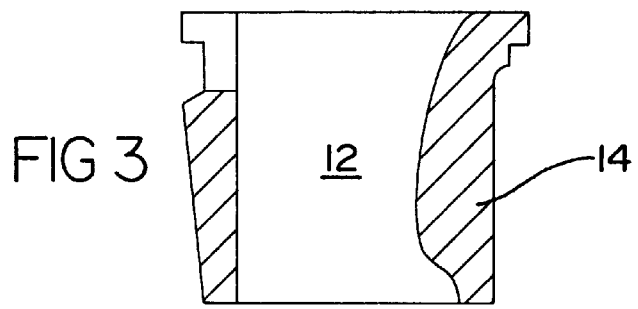
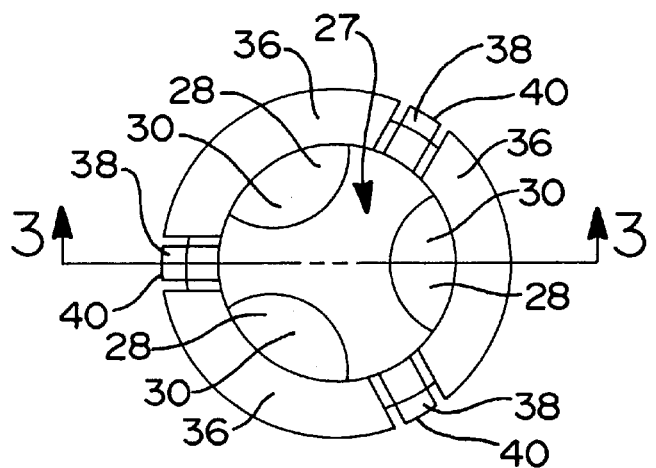

FASTENING SYSTEM

CROSS REFERENCE TO RELATED APPLICATIONS

This application is a continuation in part of U.S. patent application, Ser. No. 08/788,132, filed Jan. 24, 1997, now U.S. Pat. No. 5,799,378 for "Fastening System" the disclosure of which is hereby incorporated by reference.

BACKGROUND OF THE INVENTION

I. Field of the Invention

The present invention pertains to fastening or locking devices. More particularly, the present invention concerns fastening devices defined by cooperable elements. Even more particularly, the present invention concerns fastening devices defined by cooperable elements which may form a permanent interlock.

II. Prior Art

In the above referred to co-pending application there is disclosed therein a fastening system defined by cooperable elements which define a plurality of interlocking grids. Each grid includes an open network or matrix of intersecting walls having a bulbous member or head surmounted the junction or intersection between the intersecting walls which define the grid. Thus, in creating an interlocking relationship, the bulbous members define an interference for complimentary bulbous members or heads produced on an associated matrix, which heads are inserted into the passageway 5 or void 5 in the matrix. Because of the configuration of the heads, depending upon the material of construction, the interlocking matrices may or may not be separable.

As defined in the co-pending application the matrix is defined by plates or members. Because the plates or members are formed as integral units, oftentimes, there is insufficient space to accommodate the interlocking device thereof and thereby preclude its deployment.

As discussed hereinbelow, the present invention enables the use of a sole or single interlock between a bulb and a void or passageway while in accordance with the principles defined in the above-referred to co-pending application.

SUMMARY OF THE INVENTION

In accordance with the present invention, there is provided a fastening or locking device which, generally, comprises:

(a) a projection member, and
(b) a receptor for the projection member, the receptor including a passageway having an interference associated therewith such that the interference prevents the separation of the projection member from the receptor once the projection is urged past the interference.

As contemplated by the present invention, the projection member, generally, comprises a stem having a first end and a second end. The first end is, ordinarily, affixed or secured, either directly or indirectly, to a support surface. A head, such as a bulbous member, or the like, is fixed to the stem at the second end thereof.

The receptor comprises a body having a passageway or void formed therethrough which is dimensioned to receive the head of the projection member. An interference is created in or about the passageway. The interference may comprise any suitable means, such as an embossment or the like. The interference is sufficiently compressible such that the head of the projection member may be forced therepast. However, once therepast, the head may not be removed from the receptor in ordinary use. However, if desired, the head of the projection member may be displaced therepast upon the application of a force thereto, depending on the materials of construction. Thus, the interlock achieved between the projection member and the body may be permanent or the projection member and receptor may be separable from each other.

In use, the receptor is either integral with or further includes means for securing the body to a second support surface. Once secured thereto an interlocking relationship may be achieved between the first and second support surfaces by the insertion of the projection member into the passageway past the interference.

It is contemplated in accordance herewith that the locking device hereof be defined by individual or single cooperable units, i.e., one projection member and one receptor or a series of such individual units. However, it is within the scope of the present invention that the locking device hereof may be defined by a matrix or by an elongated strip of interconnected cooperable elements.

For a more complete understanding of the present invention, references made to the following detailed description and accompanying drawing. In the drawing like reference characters refer to like parts throughout the several view in which:

BRIEF DESCRIPTION OF THE DRAWING

FIG.ure 1 is a perspective, environmental view of a first embodiment of a locking device in accordance with the present invention;

FIG. 2 is a top plan view of the receptor shown in FIG. 1;

FIG. 3 is a cross-sectional view of the receptor taken along line 3—3 of FIG. 2 hereof;

FIG. 4 is a perspective view of the receptor of the present locking device;

DESCRIPTION OF THE PREFERRED EMBODIMENTS

Figure 1:
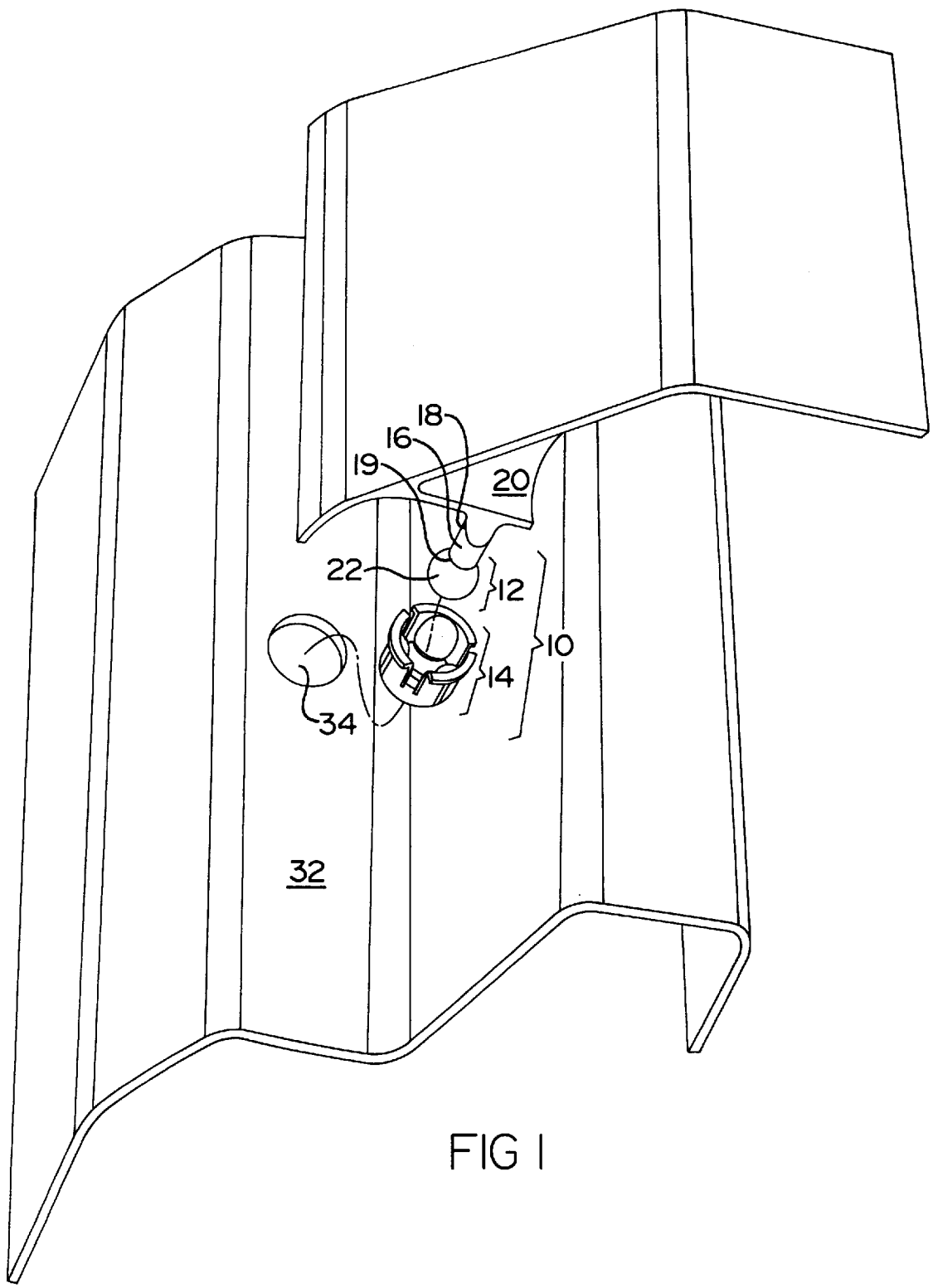
Figure 5:
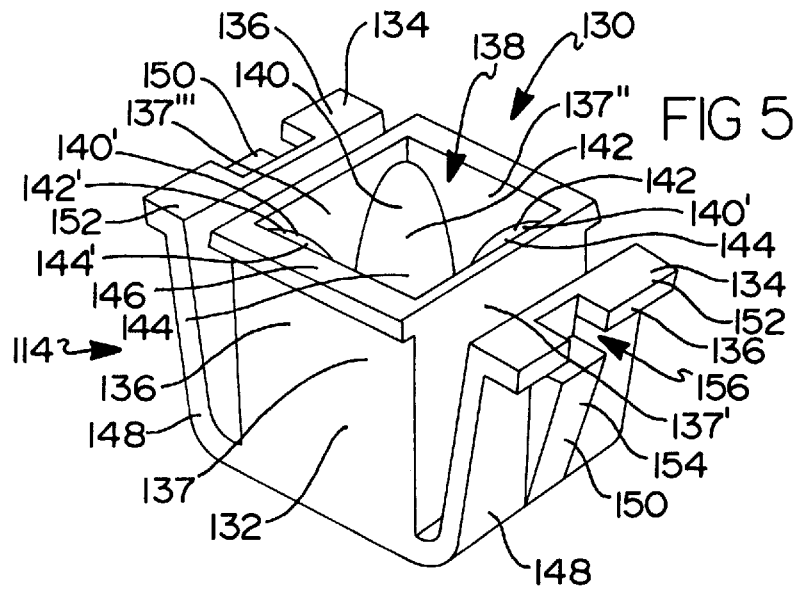
FIG. 5 is a perspective view of an alternate embodiment of the receptor portion of the locking device hereof.
Figure 7:
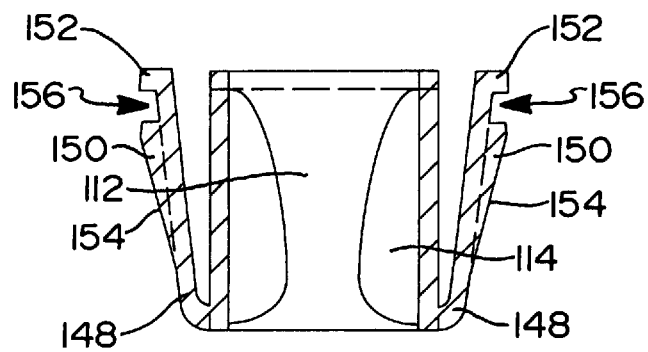
FIG. 7 is a cross sectional view taken along the line 7—7 of FIG. 6.
Figure 6:
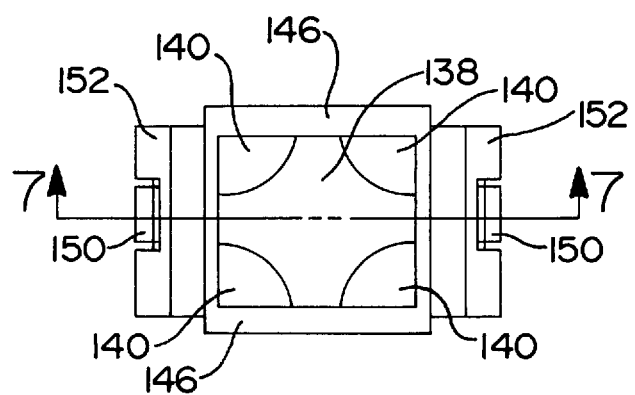
FIG. 6 is a top plan view of the receptor of FIG. 5 thereof.

Now, and with reference to the drawing, in particular FIGS. 1–4, and as above noted the present invention provides a locking device, which, generally comprises:

(a) a projection member and
(b) a receptor, the receptor comprising a body having a passageway formed therethrough, and an interference being associated with and, preferably, disposed within the passageway such that the interference, prevents the separation of the projection member from the receptor, once past the interference.

With more particularity, and as shown, a locking device in accordance with the present invention is, generally, denoted at 10. The locking device 10 includes a projection or projecting member, generally, denoted at 12 and a receptor, generally, denoted at 14. The projecting member 12 includes a stem 16 having a first end 18 and a second, opposite end 19. The first end 18 may be secured to any suitable support surface 20 such as, for example, an automotive fascia, a bicycle seat, or any other suitable support surface for which interlocking with a second support surface is desired. The projection member 12 is secured to the support surface 20 by any suitable means including being integrally formed therewith such as by molding or the like; sonically welded; bonded, etc. It is to be understood that the support surface need not be deemed critical to the present invention but is identified for purposes of environment only. In the drawing, the first support having support surface 20 is a vehicle of bumper fascia.

Referring, again, to the drawing, the projection member 12 is shown as comprising a head or bulbous member 22 is integrally formed with the stem and is disposed at the second end 19 thereof. The head 22 may be of any suitable material of construction such as disclosed in the above referred to co-pending application, and may be ovular, spherical, or the like, again, as disclosed in the co-pending application. As discussed below, the head 22 has a diameter sufficiently small to enable it to be inserted into the passageway of the body of the receptor but is larger than the reduced diameter of the passageway created about the interference so that the head may be prevented from removal from the passageway once past the interference. Similarly, and as shown, the head 22 is curvilinear so that it may complementarily engage the interference in the passageway to prevent removal of the head therepast, as described below.

The receptor 14 includes a body 24 which, in accordance with the first embodiment hereof, generally comprises a substantially cylindrical housing 26 having a wall 25 and a central passageway or void 27 formed therethrough. Thus, the body substantially defines a tubular conduit.

At least one interference 28 is associated with and is, preferably, disposed in the passageway 27. The interference may be defined by any suitable means such as an embossment 30 or the like. The interference restricts or narrows the diameter of the passageway 27 such that once the head 20 of the projection member 12 is urged therepast, the head may not be separated from the receptor upon the application of a separation force thereto, depending upon the materials of construction.

The interference may be provided on the housing, or may be and, preferably is, disposed in the passageway, as shown. Regardless of where provided, the interference or embossment 30 is sufficiently compressible or, alternatively, the head is sufficiently compressible to enable the head to be urged therepast.

The embossment may be of any suitable configuration and is integrally formed with the wall 25 of the housing 26 and projects inwardly into the passageway 27. The embossment terminates in a surface 31 which abuts against the curvilinear undersurface of the head in complementary interlocking relationship. If a longer stem is associated with the projection member, the abutment will not occur. However, the inability of the head to be displaced past the interference still remains.

The body 24 includes an annular flange 36 integral with the cylindrical wall 25. The flange 36 is adopted to seat about an aperture or opening 34 formed in a second support surface 32, as detailed below to accomplish seating within the aperture 34.

The present invention contemplates that the receptor will be associated with a second support surface and be secured thereto either directly or indirectly. Thus, the receptor may be integrally formed with the second support surface or may be affixed thereto by any suitable means such as detailed hereinbelow. In the drawing there is shown a second support surface 32 such as, for example, a fire wall, a bumper, an engine housing, etc., having an aperture 34 formed therein in which is seated the receptor 14.

The receptor further comprises at least one retention member 38 integrally formed therewith and extending radially outwardly from the wall 25 of the housing 26 and is disposed beneath the flange 36. The retention member 38 has an abutment surface 38*a* which cooperates with an abutment surface 36*b* of cooperates with the flange 36 to lock the receptor 14 within the aperture 34 of the second support surface.

Preferably, the retention member is at least one cut-out portion or relief cut out from the wall 25 of the housing 26. The cut-out portion 40 provides a relief such that the body 24 may be compressively inserted into the aperture 34. The diameter of the housing 26 is slightly larger than the diameter of the aperture 34 formed in the second support surface 32 or is substantially equal thereto so that the housing 26 can be urged thereinto, whereupon the retention members 38 are compressed inwardly and the surfaces 38*a* and the surfaces 36*b* of the flanges are brought into engagement with the opposite sides of the second support whereby to retain the receptor securely within the opening 34.

In use the projection member 12 is inserted into the passageway 27 such that the head 22 is urged past the terminus or undersurface 31 of the interference 30 to, thus, interlock the first support surface 20 to the second support surface 32. Depending on the materials of construction used to form the locking device hereof, once interlocking is achieved, the head cannot be urged past the lower surface of the interference to achieve a permanent lock, when a separation force is applied thereto. However, it is possible to modify the materials of construction so that the head may be compressible and may be separated therefrom upon application of an angular force or torque. Thus, the materials of construction may range from a rigid plastic, such as nylon, acrylic, high density polyethylene, polycarbonate, to a flexible material such as a polyethylene foam or the like.

Referring now to FIGS. 5–8, there is depicted an alternate embodiment of the locking device hereof and which is generally denoted at 110.

In accordance herewith the locking device includes a projection member 112 and a receptor 114.

The projection member includes an elongated stem 116 and a bulbous head 118. Again, as with the first embodiment the stem 116 has a first end 120 and a second end 122, the first end contemplated as being affixed either directly or indirectly, to a first support having a first support surface 124 with the head 118 being integral with the stem 116 and disposed at the second end 122. Herein, the head 118 is shown as being ovular. According to this embodiment a locking arm 126 is integral with the projection member 112 and radially projects outwardly from the stem 116. The locking arm 126 extends between a lower surface 128 of the head 118 along a suitable extent or length thereof. The locking arm 126 is integrally formed with the stem and head as shown, to define a unitary member.

The receptor 114 as shown in the drawing, generally, comprises a body member 130 of substantially rectangular configuration having a central portion 132 and at least one and preferably, a pair of opposed retention or retaining members 134 integral with the central portion 132.

More particularly, the central portion comprises a substantially rectangular housing 136 having intersecting walls 137, 137', 137", 137''', and having a passageway 138 formed therethrough. At least one and, preferably, a plurality of interference members 140, 140', 140" and 140''' disposed at the junction or intersection of each pair of walls of the rectangular housing, as shown. The interference 140, 140', 140" and 140'" comprises an embossment or similar protuberance 142 which extends into the passageway 138. Each embossment or protuberance is similarly constructed and comprises a curvilinear element 144 extending from approximately the top of housing to the bottom and terminating in a substantially planar portion 144b. Preferably, an interference or protuberance is provided at each junction.

A peripheral lip or flange or shoulder 146 is disposed, at least in part, about the top perimeter of the central portion 132 and provides an abutment surface 146b which engages a second support surface 232 of a second support.

A retention member 134 extends outwardly, respectively, from each of the vertical walls 137' and 137'". Each retention member 134' comprises a flexible resilient arm which is integral with and which laterally and upwardly extends from the bottom portion of the housing as shown.

The arm 136 includes a first leg 148 which laterally projects outwardly from the bottom of the housing and an acute arm or leg 150 connected to and integral with the first arm 136 and angularly projecting upwardly therefrom. A third arm 152 is disposed normal to the second arm 150 at the end opposite that which joins to and is united to the first arm 148. The second arm 150 has a height and width substantially equal to that of the height and width of the walls of the central portion, as shown.

Extending from the base of the first arm 148 and extending upwardly therefrom and disposed substantially centrally of the second arm 150 is a ramp surface 154. The ramp or ramp surface 154 has a length less than the length of the second arm such that a space or gap 156 is formed therebetween. Preferably, the space 156 is substantially equal to the height of or thickness of the second support surface such that the wall of the second support surface about the perimeter of the opening seats within the space 156. By importing the flexure and resiliency to the retaining arm, the retention member 134 hereof can be snap fitted into an opening provided in the second support surface, as shown in FIG. 8.

Figure 8:
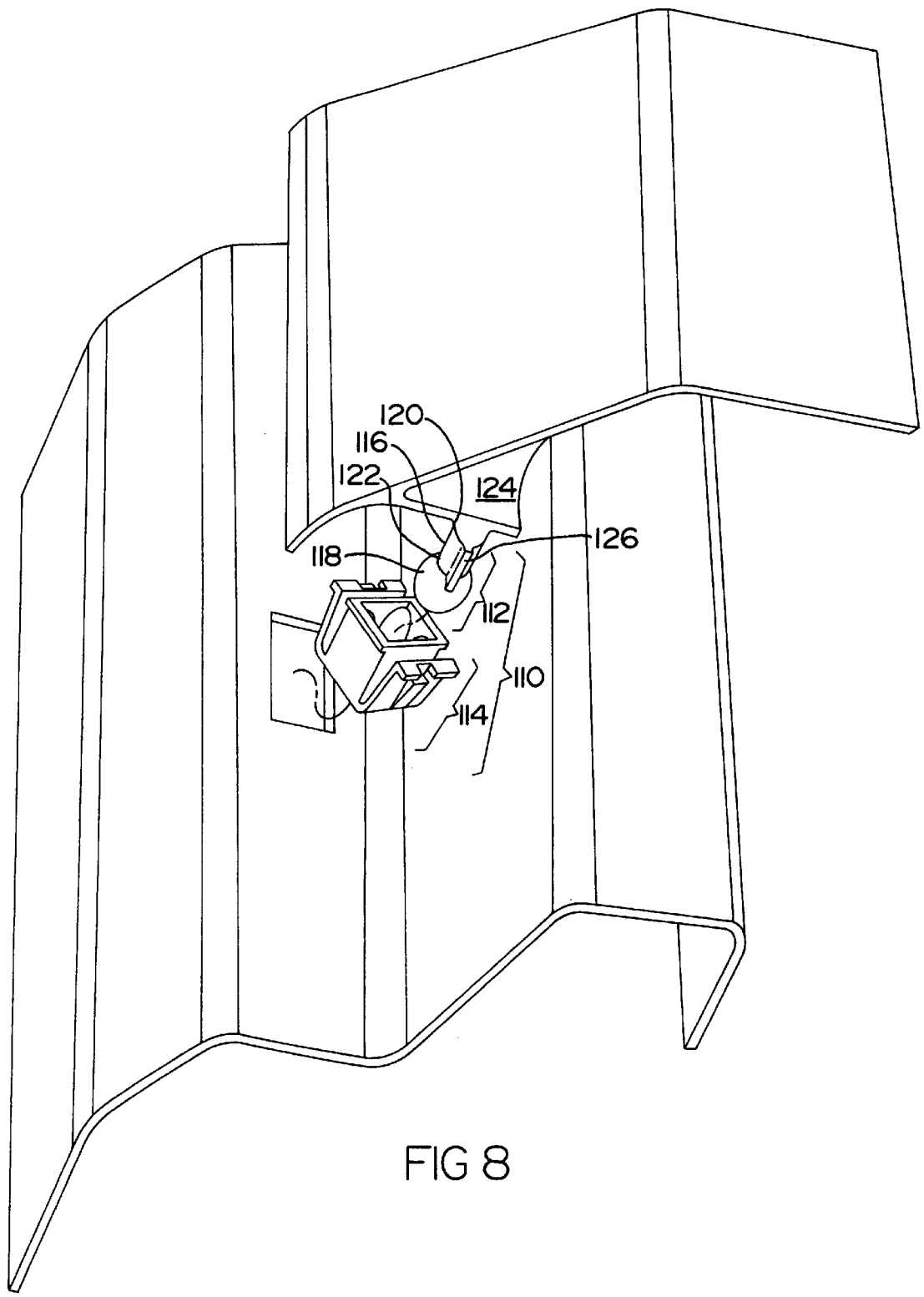
FIG. 8 is a side elevational view, partly in crosssection showing the deployment of the locking device of the second embodiment.

As hereinabove noted, the bulbous head 118 has a configuration such that, and as shown in FIG. 8, upon insertion of the projection member 112 into the passageway 138, the configuration of the head conforms to the configuration of the lower surface of the embossment so that it can nest thereagainst. The locking arm 126 has a diameter greater than the diameter of the restricted portion of the passageway to thus preclude separation of the projecting member from the embossment upon the application of a separation force thereagainst.

In practicing the present invention, and as noted above, it is contemplated that the present locking device be defined by individual or single cooperable projecting members and retainers. However, a plurality of such components can be used conjointly, either as individual components, or which may be joined together into distinct matrices of retainers and projecting members. Thus, it is contemplated that a strip or matrix or projecting members be provided along with a strip of retainers. Alternatively, a matrix can be provided of a plurality of projecting members and retainers or any other desired array.

Furthermore, although the receptor has been shown as cylindrical and rectangular, other geometer configurations are within the scope hereof including, for example, triangular, hexagonal, octagonal, etc.

Having this described the invention what is claimed is:

1. A locking device retainer comprising:

a receptor, the receptor including a rectangular housing having an upper end and a lower end and a passageway extending between said ends for receiving and retaining a locking device projecting member, said housing having adjacent walls intersecting at a junction;

an interference associated with the passageway to restrict the diameter of the passageway, at least one embossment being disposed in the passageway at one junction, the embossment defining the interference;

the housing having an upper end and a lower end; and means for retaining the receptor in an opening in a support surface, the means for retaining comprising:

a first wall extending outwardly from the housing at the lower end thereof, a second wall integral with and angularly projecting upward from the first wall, a third wall projecting outward from the second wall, and a ramp disposed on the second wall expanding upwardly from the first wall and having a length less than that of the second wall to define a space between the upper edge of the ramp and the third wall.

2. The locking device of claim 1 which further comprises:

at least a pair of opposed embossments, the embossments defining the interference.

* * * * *